Patented Aug. 30, 1932

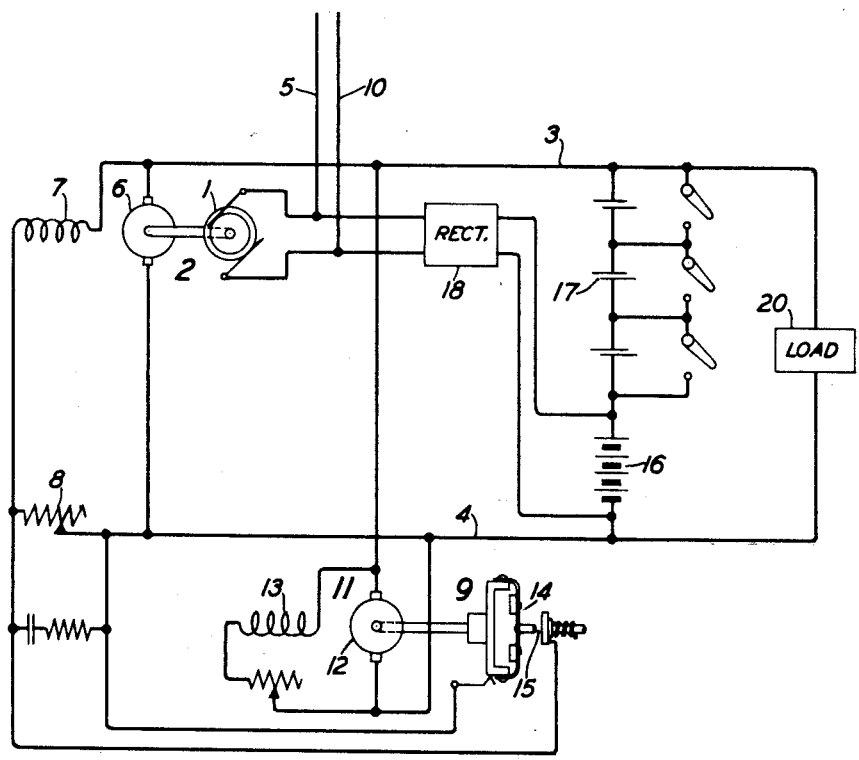

1,874,374

UNITED STATES PATENT OFFICE

JOHN H. SOLE OF BROOKLYN, NEW YORK, ASSIGNOR TO BELL TELEPHONE LABORATORIES, INCORPORATED, OF NEW YORK, N. Y., A CORPORATION OF NEW YORK

CONTROL SYSTEM

Application filed October 16, 1931. Serial No. 569,206.

This invention relates to control systems and particularly to control systems for maintaining constant voltage on load circuits.

One object of the invention is to provide a control system having a generator connected to a load circuit with a storage battery across the load circuit that shall govern the generator according to the instantaneous voltage thereof without unstable regulation by reason of the characteristic action of a storage battery in opposing instantaneous changes in voltage.

Another object of the invention is to provide a control system having a direct current source connected to a load circuit with a storage battery across the load circuit that shall maintain substantially constant voltage on the load circuit under control of the instantaneous voltage of said source and that shall insure constant voltage across the storage battery.

A further object of the invention is to provide a control system having a generator connected to a load circuit with a storage battery connected in series with counter cell across the load circuit and a source of current directly connected across the storage battery that shall maintain substantially constant voltage across the load circuit and across the storage battery by a regulator controlling the generator in accordance with the generator instantaneous voltage.

In power supply circuits for many purposes it is desirable to maintain the voltage on the load circuit substantially constant and have an auxiliary source in the form of a storage battery connected across the load circuit. In communication systems it is particularly advantageous to have the voltage of the power supply maintained constant and at the same time to insure against any failure of the power supply. In order to maintain the voltage on the load circuit constant without any extended voltage variation thereon it is advisable to have the source or the generator governed in accordance with the instantaneous generator voltage. However, it is difficult to obtain satisfactory regulation of a generator in accordance with the instantaneous voltage if a storage battery is connected across the load circuit. The characteristic action of a storage battery in opposing instantaneous changes in voltage of a generator connected thereto renders it impractical under ordinary conditions to connect the regulator across the battery terminals for controlling the generator in accordance with the instantaneous voltage thereof.

In a system constructed in accordance with the invention the generator of a motor-generator set is directly connected to a load circuit with a battery connected across the load circuit without any appreciable resistance in the load circuit between the generator and the battery. A regulator of the type disclosed in the J. H. Sole application, Serial No. 374,601, filed June 28, 1929, governs the generator excitation in accordance with the instantaneous voltage of the generator. In order to prevent the battery opposing instantaneous changes in the generator voltage counter cells are connected in series with the battery. The battery is charged by a suitable rectifier connected across the terminals of the battery.

The storage battery, under normal operating conditions, has a potential above the potential maintained across the load circuit and the potential across the storage battery and counter cells is the same as the generator voltage with little or no current flow through the counter cells. The counter cell resistance is sufficiently high when compared with that of the battery to permit instantaneous voltage fluctuations at the point of connection of the battery and counter cell to the load circuit which will not occur across the battery terminals. The counter cells are operated on a portion of their voltage-ampere curve which has small change in resistance for changes in load.

In case the main source of current comprising the generator fails, the load is carried by the storage battery. When the load is thrown on the storage batteries the number of counter cells included in the circuit is varied to control the voltage on the load circuit.

The single figure in the accompanying drawing is the diagrammatic view of a control system constructed in accordance with the invention.

Referring to the drawing, a motor generator set comprising an AC motor 1 and a DC generator 2 is provided for supplying direct current to a load circuit comprising conductors 3 and 4. The AC motor 1 is connected to a suitable alternating current source comprising conductors 10 and 5. The generator 2 comprises an armature 6 and a shunt field winding 7. A resistance element 8 under the control of a regulator 9 is connected in circuit with the shunt field winding 7. The regulator 9 is preferably of the type disclosed in the application of J. H. Sole, Serial No. 374,601, filed June 28, 1929.

The regulator 9 comprises a motor 11 having an armature 12 and a shunt field winding 13. The armature 12 is connected across the load conductors 3 and 4 in order to effect operation of a motor 11 in accordance with the voltage of the generator 2. The field winding 13 of the motor 11 is saturated or other means may be provided to insure constant field excitation so that the motor operates at a speed directly in accordance with the voltage across the load conductors 3 and 4. A centrifugal governor 14 is mounted on a shaft directly connected to the armature shaft of the motor 11 in order to be operated directly in accordance with the speed of the motor. The contact members 15 of the centrifugal governor 14 short-circuit the resistance element 8 in circuit with the generator field winding 7 in order to control the generator excitation in accordance with the voltage across the load conductors 3 and 4.

A storage battery 16 is connected in series with counter cells 17 across the load conductors 3 and 4 beyond the connection of the motor 11 of the regulator 9 to the load conductors. A suitable rectifier 18 which is connected to the alternating current supply conductors 10 and 5 is connected across the terminals of the storage battery 16. The rectifier 18 is preferably of the trickle charger type and maintains the battery in charged condition. The potential across the battery 16 is somewhat above the potential across the load conductors 3 and 4 and the number of counter cells employed is such that under normal operating conditions there is little or no current flow through the counter cells. Furthermore the counter cells are operated on a portion of their ampere voltage characteristic curve such that the resistance of the counter cells is substantially constant under varying load conditions. The load 20 is connected across the load conductors 3 and 4 at a point beyond the connection of the storage battery 16 and the counter cells 17.

In a control system constructed as above set forth the regulator 9 is operated in accordance with instantaneous changes in generator voltage to maintain the voltage on the load conductors substantially constant and also to maintain a substantially constant potential across the battery 16. The resistance of the counter cells is sufficiently high, when compared with that of the battery, to permit instantaneous voltage fluctuations at the point of connection of the battery and counter cells to the load circuit which will not occur across the battery terminals.

Modifications in the system and in the arrangement and location of parts may be made within the spirit and scope of the invention and such modifications are intended to be covered by the appended claims.

What is claimed is:

1. In a control system, a direct current generator connected to a load circuit, a voltage regulator operated in accordance with the instantaneous voltage of the generator for controlling the generator excitation to maintain constant voltage on the load circuit, a storage battery connected across the load circuit, and counter cells inserted in series with said battery across the load circuit to prevent the battery opposing instantaneous changes in the generator voltage.

2. In a control system, a source of direct current connected to a load circuit, a storage battery connected in series with counter cells across said load circuit, said storage battery normally having a potential above the potential from said source and said counter cells being of size to insure substantially no current flow from the storage battery to the load circuit or from the source to the battery, and switching means for shunting said counter cells to supply current from the storage battery to the load in case of failure of said source.

3. In a control system, a motor generator set operated from a source of alternating current and connected to a direct current load circuit, a storage battery connected in series with counter cells across said load circuit, a voltage regulator operated in accordance with the instantaneous voltage of the generator for controlling the generator excitation to maintain constant voltage on the load circuit, and a source of rectified current connected to said storage battery.

4. In a control system, a direct current generator connected to a load circuit, a voltage regulator for controlling the generator excitation in accordance with the generator instantaneous voltage to maintain constant voltage on the load circuit, a storage battery connected in series with counter cells across said load circuit, and a source of rectified current connected across said battery.

5. In a control system, a direct current generator connected to a load circuit, a voltage regulator for controlling the generator in accordance with the generator instantaneous voltage to maintain constant voltage on the load circuit, a storage battery normally having a voltage above the generator voltage and counter cells connected across the load circuit in series with said battery, said counter cells developing an opposing potential to insure substantially no current flow therethrough when the system is in normal condition and the load circuit is supplied with potential from the generator and to prevent the battery opposing instantaneous changes in the generator voltage.

6. In a control system, a direct current generator connected to a load circuit, a voltage regulator for controlling the generator in accordance with the generator instantaneous voltage to maintain constant voltage on the load circuit, a storage battery, a rectifier for normally charging said battery to a potential above the generator potential, and counter cells connected across the load circuit in series with said battery to insure substantially no current flow between the battery and the load circuit under various load conditions when the load is being carried by the generator.

7. In a control system, a direct current generator connected to a load circuit, a voltage regulator for controlling the generator excitation in accordance with the generator instantaneous voltage to maintain constant voltage on the load circuit, a storage battery, a rectifier for normally charging said battery to a potential above the potential across the generator terminals, and counter cells connected in series with the battery across the load circuit to prevent the battery opposing instantaneous changes in the generator voltage, said counter cells being operated at a point on their volt-ampere curve that has small change in voltage for load changes.

In witness whereof, I hereunto subscribe my name, this 14th day of October, 1931.

JOHN H. SOLE.